United States Patent Office 3,503,670
Patented Mar. 31, 1970

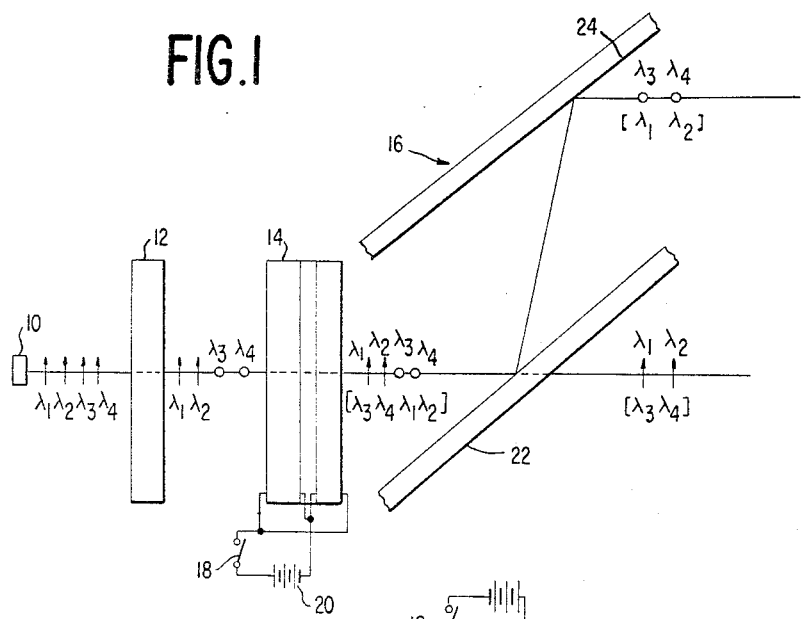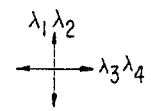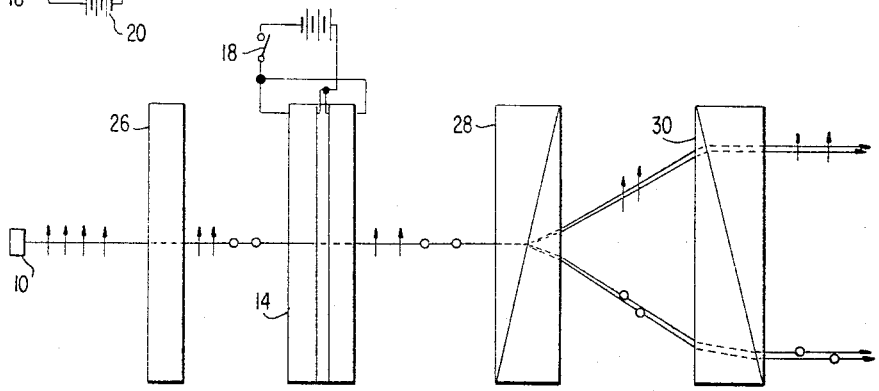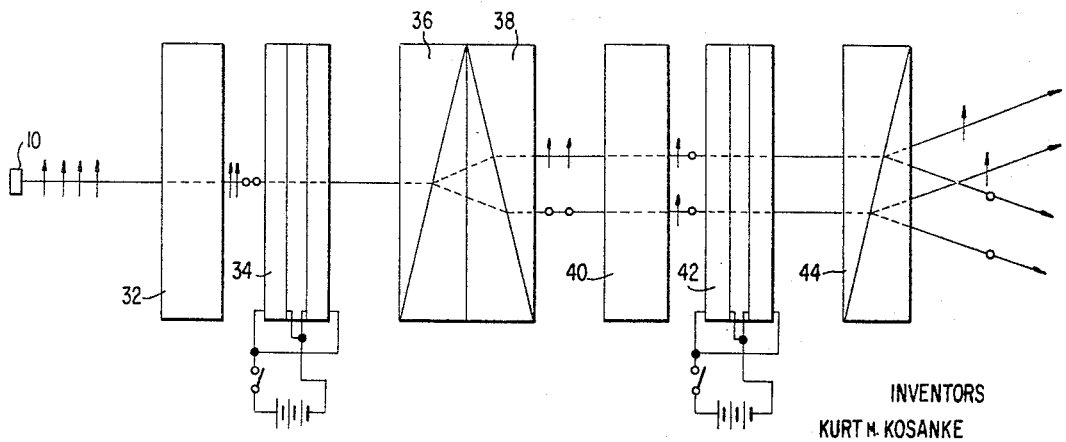

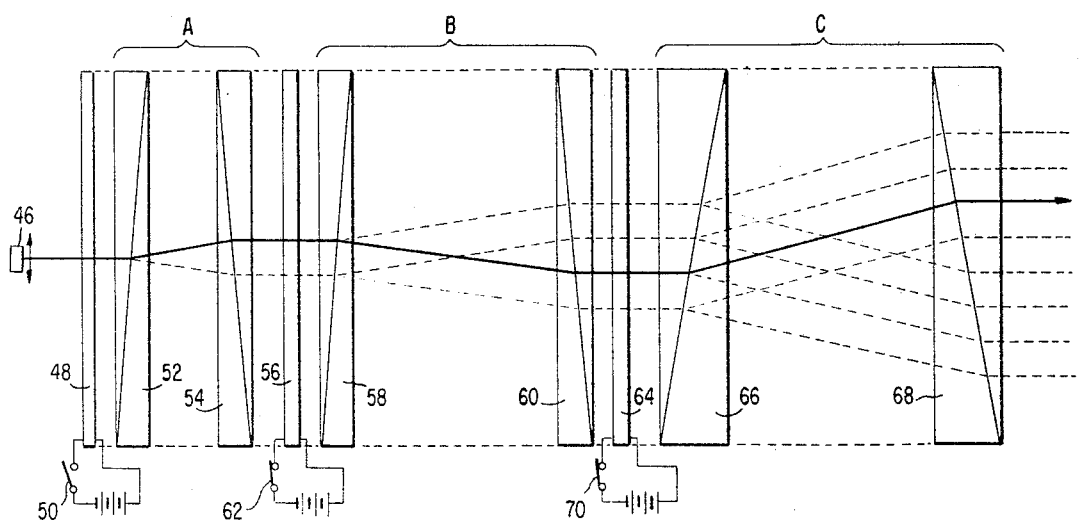
FIG.4
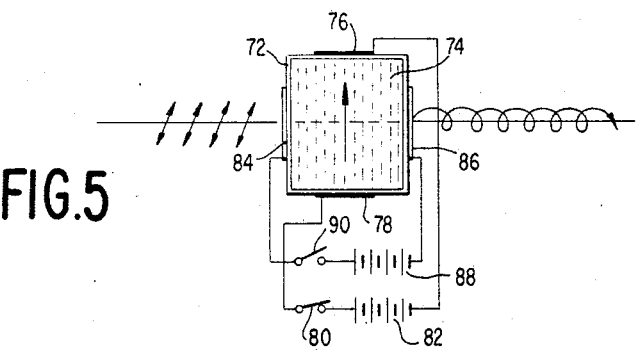
FIG.5
FIG.6
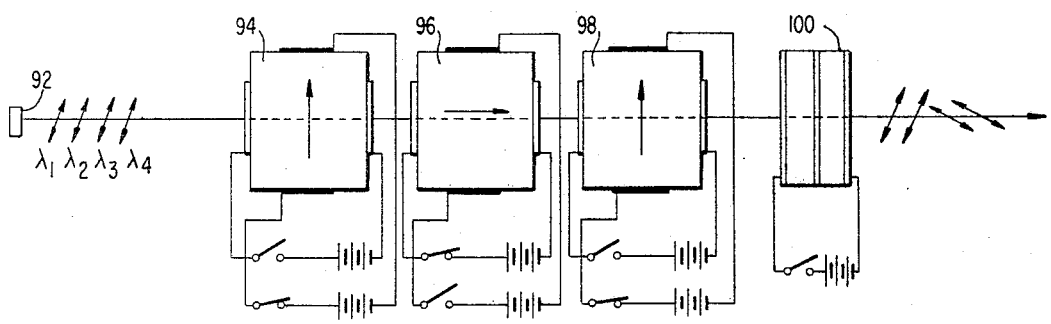

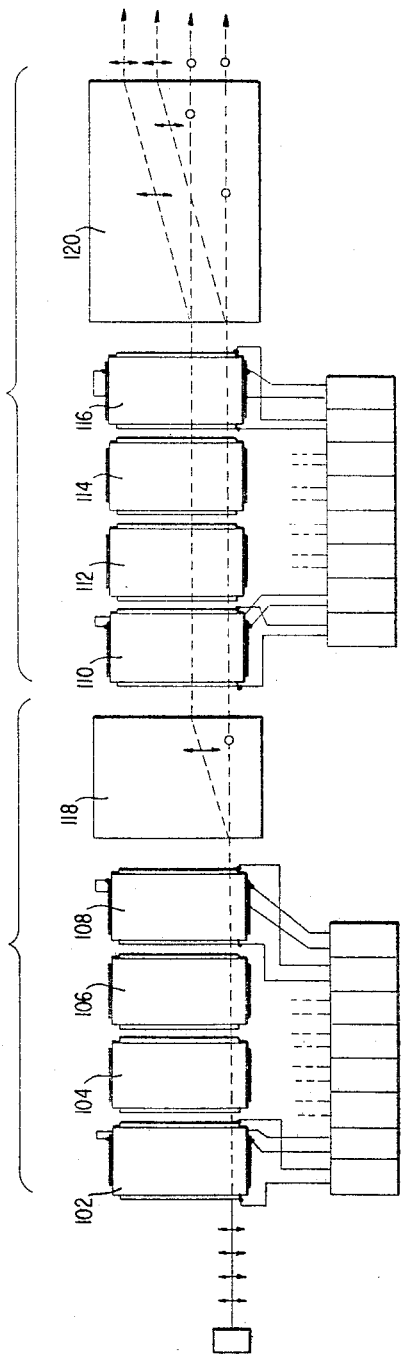

3,503,670
MULTIFREQUENCY LIGHT PROCESSOR AND DIGITAL DEFLECTOR
Kurt M. Kosanke and Werner W. Kulcke, Boblingen, and Erhard Max, Sindelfingen, Germany, assignors to International Business Machines Corporation, Armonk, N.Y., a corporation of New York
Filed Jan. 16, 1967, Ser. No. 609,638
Int. Cl. G02f 1/26, 1/40; H03k 19/14
U.S. Cl. 350—150                                10 Claims

ABSTRACT OF THE DISCLOSURE

An apparatus for controlling the polarization of multifrequency light and deflecting the light in accordance with the polarization thereof to provide a plurality of position and frequency related light outputs. A dispersive rotator polarizes the light to give specific wavelengths perpendicular polarization directions. Polarization dependent beam splitters split the beam into parallel beams depending upon their polarization.

BACKGROUND OF THE INVENTION

The present invention is concerned broadly with controlling the plane of polarization of a plurality of light waves in a single beam, each of which is of a different frequency, so as to enable the subsequent separation of the light beam into its component light waves. According to this invention, the individual light waves may be separated into a plurality of parallel spaced beams by means of a beam splitting crystal, a totally internal reflecting polarization dependent beam splitter, a Wollaston prism or other similar means, such as field induced liquid crystal cells.

SUMMARY OF THE INVENTION

The present invention is comprised of means for producing a beam of plane polarized light having a plurality of different wavelengths, means for rotating the plane of polarization of selected wavelengths to a position perpendicular to the plane of polarization of the remaining wavelengths and polarization dependent beam splitting means adapted to split said beam into two spaced apart, parallel beams comprised of said selected wavelengths and said remaining wavelengths respectively.

According to the present invention, the polarization planes of the various wavelengths may be properly oriented with respect to each other prior to their separation by means of a dispersion rotator or a dispersive phase plate in combination with an electro-optical polarization control device. An alternative apparatus for properly orienting the polarization planes of the various wavelengths in the incident beam is comprised of a series of electric field controlled liquid crystal cells. Once the polarization direction of the various wavelengths is properly oriented, the beam may be split by a beam splitting crystal, a Wollaston prism or other suitable means.

Therefore, the object of the present invention is to provide a plurality of light outputs functionally related and position and light frequency. This object, along with other features and advantages of the invention, will be apparent from the following description and the accompanying drawings in which:

FIGURE 1 is a schematic view of a single stage, multifrequency light processor and digital deflector;

FIGURE 2 is a schematic view of a modified single stage, multifrequency light processor and digital deflector;

FIGURE 2A is a schematic view showing the polarization directions behind the dispersion rotator of FIGURE 1 or the dispersive phase plate of FIGURE 2;

FIGURE 3 is a schematic view of a two-stage multifrequency light processor and digital deflector wherein the device at each stage is similar to the device shown in FIGURE 2;

FIGURE 4 shows a schematic view of a digital light deflector with a plurality of Wollaston prism deflection stages;

FIGURE 5 is a schematic view of an electric field responsive liquid crystal polarization control device;

FIGURE 6 is a schematic view of a multiple-frequency light polarization control device utilizing a plurality of liquid crystal cells, such as shown in FIGURE 5, and FIGURE 7 is a schematic view of a two-stage deflector device utilizing a plurality of multifrequency light polarization control devices such as shown in FIGURE 5 in combination with beam splitting crystals.

In FIGURE 1, there is shown a polarized light generator in combination with a multifrequency processor and digital deflector which is capable of positioning a beam of linearly polarized light in a plurality of paths so as to give two outputs. The light generator 10 includes a light source and polarizing device capable of producing a light beam having a plurality of light wavelengths, in this case, four light wavelengths, which is plane polarized in the vertical direction (parallel to the plane of the paper, as indicated by the small vertical lines $\lambda_1$, $\lambda_2$, $\lambda_3$ and $\lambda_4$). In all of the figures, the light will be considered as moving from left to right.

The elements which make up the multifrequency light processor and digital deflector are a dispersive rotator 12 which may be made from an optically active material, such as quartz, an electro-optic crystal assembly 14 which works as a polarization switch over a wide range of light wavelengths and a totally internal reflecting polarization dependent beam splitter generally indicated at 16.

The dispersion of the polarization rotator 12 is used to separate four light wavelengths $\lambda_1$, $\lambda_2$, $\lambda_3$ and $\lambda_4$ into pairs indicated as $\lambda_1$, $\lambda_2$ and $\lambda_3$, $\lambda_4$ with respect to two mutually perpendicular polarizations directions. The circular symbols designating the wavelengths $\lambda_3$ and $\lambda_4$ behind the dispersion rotator 12 indicates that the polarization direction of these wavelengths is perpendicular to the plane of the paper. The specific perpendicular wavelengths will be a function of the specific rotation characteristic of that wavelength in the rotator 12. For example, using a conventional quartz crystal with a length of 20 mm., a wavelength of 6670 A. has a specific rotation of 18 degrees per mm. and therefor produces a polarization orientation of $360° = 0°$. Another wavelength of 5990 A. in the same quartz crystal will have a specific rotation of 22.5° per mm. and produce a polarization orientation of $450° = 90°$. Likewise, a wavelength of 4460 A. with a specific rotation of 40.5° per mm. will produce the same polarization orientation of $810° = 90°$. As seen from these examples, selection of the appropriate length of quartz and the correct wavelengths will allow the optical system to rotate two different wavelengths the same amount. The electro-optic switch 14 is provided for a mutual exchange of these polarization directions. The crystals of the electro-optic switch assembly 14 are bounded by transparent conductive electrodes which in turn are connected by means of a circuit including switch 18 to a source of high voltage 20. If the switch 18 is open (as shown), the electro-optic switch assembly 14 has no effect on the polarization direction of the light beam and wavelength $\lambda_1$ and $\lambda_2$ remain polarized in the plane of the paper and the wavelengths $\lambda_3$ and $\lambda_4$ remain polarized perpendicular to the plane of the paper. If, however, the voltage is applied to the crystal by closing switch 18, there will be a mutual exchange of the polarization directions, as shown by wavelength designations in the brackets.

After leaving the electro-optical polarization control device, the beam of light passes to the light deflector portion of the arrangement which includes a birefringent plate 22 having an optically flat polished surface in the path of the light beam. The optic axis of the reflecting birefringent plate 22 is parallel to its reflecting surface and perpendicular to the plane of the drawing. This plate 22 is relatively bent and preferably is a calcite crystal. Other birefringent crystals (such as sodium nitrate) can also be used. The calcite plate is inclined at 20° to the light beam axis, and thus presents an angle of incidence, 70° as an example, which is greater than the critical angle (63.6°) for a total reflection for a polarized light beam which is perpendicular to the plane of the drawing. The wavelengths $\lambda_1$ and $\lambda_2$ which remain polarized in the plane of the drawing when the switch 18 is open impinge on the surface of the calcite plate 22 at an angle which is less than critical, thereby allowing these wavelengths to be completely transmitted. Above the calcite plate 22, an alignment plate 24 is positioned with an optically flat polished surface arranged parallel to the reflecting surface of birefringent plate 22. It is apparent that the plates can be mounted by conventional means (not shown) which permit ease of adjustment for spacing and alignment. The crystal alignment plate 24 is made from a material which has a refractive index less than or equal to the low index of refraction of the material of the deflecting plate 22 so that the total external reflection relative to the crystal (considering the angles of incidence) again occurs and the path of the deflected beam is aligned or made parallel to the transmitted beam. Crystal plate 24 can be an isotropic material, such as glass or sodium fluoride.

Thus when no voltage is applied to the electro-optical assembly 14, the wavelengths $\lambda_1$ and $\lambda_2$ will be passed by the birefringent plate 22 and the wavelengths $\lambda_3$ and $\lambda_4$ will be reflected from the surfaces of the birefringent crystal and the alignment plate parallel to the wavelengths $\lambda_1$ and $\lambda_2$. When switch 18 is closed and voltage applied to the assembly 14, the wavelengths $\lambda_3$ and $\lambda_4$, as indicated in brackets, will pass through the birefringent crystal 22 and the wavelengths $\lambda_1$, and $\lambda_2$, as indicated in brackets, will be reflected from the birefringent crystal and the alignment plate parallel to the wavelengths $\lambda_3$ and $\lambda_4$.

In FIGURE 2, a device equivalent to the device shown in FIGURE 1 is illustrated, but the dispersive rotator is replaced by a dispersive phase plate 26 and the polarization dependent beam splitter 16 is replaced by a pair of Wollaston prisms 28 and 30. The light generator and the electro-optical crystal assembly are identical to those illustrated in FIGURE 1. The dispersion of the phase plate 26 leads to the same result as the dispersion of the rotator, that is, wavelengths $\lambda_1$ and $\lambda_2$ are polarized in the plane of the drawing and wavelengths $\lambda_3$ and $\lambda_4$ are polarized in a plane perpendicular to the plane of the drawing. FIGURE 2A is an end view of the light beam behind the dispersion rotator or the dispersive phase plate showing the polarization directions.

When the switch 18, in FIGURE 2, is open, the wavelengths $\lambda_1$ and $\lambda_2$ are deflected upwardly and the wavelengths $\lambda_3$ and $\lambda_4$ are deflected downwardly by means of the Wollaston prism. If the switch 18, in FIGURE 2, is closed and high voltage is applied to the crystal assembly 14, wavelengths $\lambda_3$ and $\lambda_4$ would be deflected upwardly and the wavelengths $\lambda_1$ and $\lambda_2$ would be deflected downwardly. The wavelengths, as indicated in the brackets, are for the condition when the switch 18 is in the closed position. In this embodiment, the two Wollaston prisms are deflection direction compensated. That means that the split beams which leave the first Wollaston prism divergently are made parallel by the action of the second Wollaston prism. This Wollaston prism deflection stage exhibits some additional dispersion in the output positions for different light wavelengths, as indicated in the drawings. However, the separation is very much exaggerated in FIGURE 2 for the purpose of illustration only.

The combination of dispersive rotators, dispersive phase plates, electro-optical switches, and spacially deflecting prisms, such as the polarization dependent beam splitter, Wollaston prisms, birefringent single crystals with special orientation, and other beam splitting prisms are not illustrated in all possible varieties. It is however, contemplated within the scope of the present invention that the various elements illustrated in FIGURES 1 and 2 may be arranged in numerous other combinations to achieve the same result.

In FIGURE 3, a device is shown utilizing two stages in order to achieve twice as many light outputs as is possible with a single stage. The first stage consists of three units not counting the light generator 10 which is identical to the light generators shown in FIGURES 1 and 2. A dispersion rotator 32 separates the four incident light wavelengths $\lambda_1$, $\lambda_2$, $\lambda_3$ and $\lambda_4$ into two pairs, $\lambda_1$, $\lambda_2$ and $\lambda_3$, $\lambda_4$ of mutual perpendicular polarization direction. An electro-optical switch 34 controls the polarization directions in the same manner in which the switch 14, descirbed above, controls the polarization directions. The compensated Wollaston deflection prisms 36 and 38 separate the wavelengths $\lambda_1$, $\lambda_2$ and $\lambda_3$, $\lambda_4$ spacially in the same manner as shown in FIGURE 2. The second stage is equivalent to the first stage but the dispersion rotator 40 is designed to make mutual polarization pairs $\lambda_1$, $\lambda_3$ and $\lambda_2$, $\lambda_4$. An electro-optical switch 42 is provided to control the polarization directions and the Wollaston prism 44 separates the light frequencies according to their polarization direction. A second Wollaston prism (not shown) may be added to the second stage to compensate the deflection direction of the wavelengths to place them in parallel paths.

FIGURE 3 shows the use of four light wavelengths. However, more or less than four light wavelengths may be used. In that case, the optical elements, such as the dispersion rotators and the phase plates, as well as the electro-optical switches will have to be designed especially for the number of light frequencies.

FIGURE 4 shows a digital light deflector with Wollaston prism deflection stages. In this device, a light generator 46 provides a beam of light having a single wavelength plane polarized in the plane of the drawing. Three sets of Wollaston prisms A, B and C are provided at each stage of the device, respectively, and are deflection direction compensated. The first set of Wollaston prisms A comprised of the two prisms 52 and 54 are mounted behind an electro-optical switch assembly 48 in the direction in which the light beam travels. When the switch 50, which controls the voltage to the electro-optical switch assembly, is in the open position, the beam of light will be deflected upwardly as shown by the heavy line. If, however, the switch 50 is closed and a high voltage is applied to the electro-optical switch assembly 48, the polarization plane of the light will be rotated by 90° and upon entering the set of Wollaston prisms, the beam will be directed downwardly, as shown by the dotted line. The second and third stages of the device, as shown in FIGURE 4, are similar to the device in the first stage except for the thickness of the prisms and the distances therebetween. The second stage is comprises of a pair of Wollaston prisms 58 and 60 and an electro-optical switch assembly 56 controlled by a switch 62. The third stage of the device is comprised of a pair Wollaston prisms 66 and 68 in combination with an electro-optical switch assembly 68 controlled by switch 70.

By opening and closing various combinations of the switches 50, 62 and 70, the position of the output beam of light may be modified. In the example shown in FIGURE 4, the path followed by the light beam shown with the solid line is obtained by opening switch 50 and closing switches 62 and 70. With the switch 50 open, the incident beam of light from the light generator 46 passes the electro-optical switch assembly 48 without rotation and is deflected upwardly by the Wollaston prism 52. The polarization plane of the beam of light is then rotated 90° by the electro-optical switch assembly 65 since the switch 62 is closed to apply a high potential to the crystal. Since the beam of light is now polarized in a plane perpendicular to the plane of the drawing, the light beam will be deflected downwardly by the Wollaston prism 58. By closing the switch 70, a high voltage is applied to the electro-optical switch assembly 64 to rotate the plane of polarization 90° so that the polarization plane once again lies in the plane of the drawing. Thus, the beam will be deflected upwardly by the Wollaston prism 66 and after the final deflection direction compensation by the prism 68, the beam will emerge in a direction parallel to the initial beam.

FIGURE 4 shows a one dimensional deflector only. However, two dimensional deflection is possible.

The device shown in FIGURE 5 enables a single light frequency to be changed in its polarization direction such that it will be perpendicular to the remaining light frequencies in the light beam. The device consists of a transparent vial or cell 72 filled with a liquid crystal material 74. A first electrode pair 76 and 78 is secured to the cell and is connected to a source of high voltage 82 by switch 80. A second set of electrodes 84 and 86 is also secured to the cell 72 and is connected to a source of high potential 88 by means of the switch 90. If a voltage is applied to a first electrode pair 76 and 78 by closure of the switch 80, as shown in FIGURE 5, the molecules of that liquid crystal material will align in the direction of the electric field, as shown by the arrow, which is perpendicular to the light direction.

Giant molecules of elongated structure often exhibit birefringence if they form a microscopic structure known as liquid crsytals. The optic axis of such liquid crystals coincides with the elongated axis of the molecules. Many kinds of such molecules have a considerable dipol momentum which makes them aligned in an external field. This property is made use of in the cell of FIGURE 5.

Therefore, the light that passes the liquid crystal of said orientation gets split in two components, the ordinary ray and the extraordinary ray which is rotated 90° with respect to the ordinary ray. Both have the same direction, but different speed, thus getting out of phase. Upon recombination, this phase shift causes, in general, an elliptic polarization state.

If the relative phase difference $\phi$ equals $(2N+1)\pi$, the resulting linear polarization is perpendicular to the polarization of the incident beam. If $\phi$ equals $2N\pi$, the resulting polarization direction is the same as that of the incident beam. ($N=0, 1, 2$).

Due to the dispersion of the indices of refraction, the total phase difference in a cell of given length, depends on the light wavelengths. As an example, the light wave $\lambda_1$ could pick up $\phi\lambda_1=23\pi$ and the wavelength $\lambda_2$ picks up $\phi\lambda=24\pi$. The result is that these two wavelengths are polarized linearly but perpendicular to each other upon leaving the cell. If more wavelengths $\lambda_1 \ldots \lambda_n$ pass a cell, there can always be found a length of the cell whereby at least one wavelength $\lambda_k$ is polarized perpendicular to all other wavelengths upon leaving the liquid crystal cell.

If in FIGURE 5, the voltage is applied to the second pair of electrodes 84 and 86, instead of to the pair of electrodes 76 and 78, the liquid crystal molecules will align parallel to the light beam. This is now the direction of the optic axis and therefore, no birefringence occurs. All light passes now without change of its polarization state.

The effect of putting several such cells in series leads to a binary selection rule for the polarization direction of the wavelength passing this device. Considering the example shown in FIGURE 6, a beam of light is produced by the light generator 92 having four wavelengths $\lambda_1, \lambda_2,$ $\lambda_3$ and $\lambda_4$. Three liquid crystal cells 94, 96 and 98 are arranged in series, each of which is a different length. Thus, in the birefringent state, cell 94 makes $\lambda_1$ to be polarized perpendicular to all other wave lengths ($\lambda_1 | \lambda_2, \lambda_3, \lambda_4$), cell 96 by itself causes $\lambda_2$ to become polarized perpendicular to all other wavelengths ($\lambda_2 | \lambda_1, \lambda_3, \lambda_4$), and cell 98 by itself causes $\lambda_3$ to become polarized perpendicular to the other wavelengths ($\lambda_3 | \lambda_1, \lambda_2, \lambda_4$). To describe the result of the combined cells, the birefringent state of a cell, that is, when the arrow in the cell is in a direction perpendicular to the light beam, will be designated as "1" and the state at which it is nonbirefringent will be designated as "0." That way we can list the possible polarization combinations according to the cell states. This is done in the table.

TABLE

[The light wavelength $\lambda_1\lambda_2\lambda_3\lambda_4$ enter cell-1 all with the same linear polarization direction]

| Cell-1 ($\lambda_1 \perp \lambda_2\lambda_3\lambda_4$) | Cell-2 ($\lambda_2 \perp \lambda_1\lambda_3\lambda_4$) | Cell-3 ($\lambda_3 \perp \lambda_1\lambda_2\lambda_4$) | Result |
|---|---|---|---|
| 0 | 0 | 0 | $\lambda_1\lambda_2\lambda_3\lambda_4$ |
| 1 | 0 | 0 | $\lambda_1 \perp \lambda_2\lambda_3\lambda_4$ |
| 0 | 1 | 0 | $\lambda_2 \perp \lambda_1\lambda_3\lambda_4$ |
| 0 | 0 | 1 | $\lambda_3 \perp \lambda_1\lambda_2\lambda_4$ |
| 1 | 1 | 0 | $\lambda_1\lambda_2 \perp \lambda_3\lambda_4$ |
| 0 | 1 | 1 | $\lambda_2\lambda_3 \perp \lambda_1\lambda_4$ |
| 1 | 1 | 1 | $\lambda_4 \perp \lambda_1\lambda_2\lambda_3$ |
| 1 | 0 | 1 | $\lambda_1\lambda_3 \perp \lambda_2\lambda_4$ |

As one sees from the table, the number of combinations which can be performed by three of the described liquid crystal cells is eight. This is true for four light wavelengths, switched to two mutual perpendicular polarization directions. However, sixteen different combinations are possible. To achieve that we have to add to the system of three cells an electro-optical switch 100 which is achromatic for switching any polarization state to its perpendicular direction. This is shown in FIGURE 6.

In case six light frequencies, $\lambda_1 \ldots \lambda_6$ have to be controlled in the same way, one would need five cells similar to the cell shown in FIGURE 5 to do it. The functions of the cells could be analog to the former example. The number of combinations in wavelengths $\lambda$ is $2^5=32$. The use of an additional achromatic electro-optical switch increases this number to 64. In general $n$ wavelengths require $n-1$ cells to perform the maximum number of $2^{n-1}$ different wavelength combinations in the two mutual perpendicular polarization directions. In case the absolute polarization directions can be distinguished, the number of possible combinations can be made $2^n$ by adding an anchromatic electro-optical switch that changes all polarizations to their perpendicular directions.

It is obvious that the device described performs a similar function as the light deflector does. But the light deflector has a spacially encoded output function, whereas the described devices have a light frequency-polarization direction encoded output function.

One advantage over the light deflector is that lower voltages are required to switch the liquid crystal cells. However, the switching will not be as fast as that of electro-optical crystals due to the fact that molecules have to align in the electric field.

It is possible to substitute a liquid crystal cell arrangement shown in FIGURES 5 and 6 for the combination of the dispersive rotator 12 and electro-optical switch assembly 14 of FIGURE 1, or for the dispersive phase plate 26 and the electro-optical switch assembly 14 of FIGURE 2. This new device, as shown in FIGURE 7, would then consist of electric field controlled liquid crystal cells and beam splitting means that separate light beams according to their polarization direction and would, therefore, have a greater multiplicity of output arrangements than the arrangement shown in FIGURES 1 and 2. In FIGURE 7, a two-stage deflector device is shown. The control means of both stages are identical but the beam separating crystals in each stage have different separation power. In the example shown four light frequencies are used and the two stages of the device give four output positions.

The cells used for the polarization control 102, 104, 106, 108, 110, 112, 114 and 116 are the same as the cell described above in conjunction with FIGURE 5. The combination of the four cells is similar to the arrangement shown in FIGURE 6 but with the electro-optical switch 100 of FIGURE 6 being replaced by a fourth cell which would give to all wavelengths the phase shift $\phi = N\pi$ if switched to state "1." Thus, if switched to "1" cell 102 makes the polarization direction of the light wavelength $\lambda_1$ perpendicular to all others, the cell 104 makes the polarization direction of the light wave $\lambda_2$ perpendicular to all others, cell 106 makes the polarization direction of the lightwave $\lambda_3$ perpendicular to all others and cell 108 makes all wavelengths to change their polarization direction 90°.

In FIGURE 7, the beam separators are shown to be beam splitting crystals 118 and 120. However, it will be understood that these could be replaced by any of the previously described beam splitting devices.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A multifrequency light processing device comprising light generating means for producing a beam of plane polarized light having a plurality of wavelengths, polarization control means for orienting the polarization plane of at least one of said wavelengths perpendicular to the polarization plane of the other wavelengths and beam splitting means for separating said wavelengths having mutually perpendicular polarization planes into at least two separate spaced apart parallel light outputs.

2. A light processing device as set forth in claim 1 wherein said polarization control means is comprised of a dispersion rotator in combination with an electro-optical switch assembly.

3. A light processing device as set forth in claim 1 wherein said polarization control means is comprised of a dispersive phase plate in combination with an electro-optical switch assembly.

4. A light processing device as set forth in claim 1 wherein said polarization control means is comprised of at least one electric field controlled liquid crystal cell.

5. A light processing device as set forth in claim 1 wherein said polarization control means is comprised of a plurality of electric field controlled liquid crystal cells in series, each of which controls the polarization direction of a single wavelength.

6. A light processing device as set forth in claim 5 further comprising an electro-optical switch located after said cells for changing upon energization the polarization direction of all the wavelengths subsequent to their passage through said cells.

7. A light processing device as set forth in claim 5 wherein the number of electric field controlled liquid crystal cells is equal to $n-1$ where $n$ is the number of wavelengths in said beam.

8. A light processing device as set forth in claim 7 further comprising an additional electric field controlled liquid crystal cell located after said cells for changing upon energization the polarization direction of all the wavelengths subsequent to their passage through said plurality of cells.

9. A light processing device as set forth in claim 1 wherein said beam splitting means is comprised of a polarization dependent beam splitter having a birefringent crystal plate disposed at an angle with respect to said beam subsequent to said polarization control means for passing those wavelengths polarized in the plane of said original polarized beam of light and reflect those wavelengths polarized in a plane perpendicular thereto and alignment means parallel to said birefringent plate means for reflecting said reflected wavelengths in a direction parallel to said passed wavelengths.

10. A light processing device as set forth in claim 1 wherein said beam splitting means is comprised of a first Wollaston prism for divergently separating wavelengths which are polarized in mutually perpendicular directions and a second Wollaston prism for compensating the deflection direction of said wavelengths to place said wavelengths in parallel spaced apart paths.

References Cited

UNITED STATES PATENTS

| 3,403,260 | 9/1968 | Geusic et al. | 350—150 X |
| 3,403,261 | 9/1968 | Bowers et al. | 350—150 X |
| 3,403,262 | 9/1968 | Seidel | 350—150 X |

OTHER REFERENCES

Jenkins & White, "Fundamentals of Optics," third ed., 1957, McGraw-Hill Book Company, Inc., pp. 573–575, Section 28.2.

Duda et al.: "Analog Light Scanner and Digital Light Deflector," IBM Technical Disclosure Bulletin, vol. 8, No. 9, February 1966, pp. 1242–1243.

DAVID SCHONBERG, Primary Examiner

P. R. MILLER, Assistant Examiner

U.S. Cl. X.R.

350—152, 157